United States Patent [19]

Bruya

[11] Patent Number: 4,906,302
[45] Date of Patent: * Mar. 6, 1990

[54] SOLIDS DECONTAMINATION METHOD WITH AMMONIA

[76] Inventor: James E. Bruya, 4201 35th Ave., W., Seattle, Wash. 98199

[ * ] Notice: The portion of the term of this patent subsequent to Jun. 27, 2006 has been disclaimed.

[21] Appl. No.: 332,920

[22] Filed: Apr. 4, 1989

Related U.S. Application Data

[63] Continuation-in-part of Ser. No. 113,628, Oct. 26, 1987, Pat. No. 4,841,998.

[51] Int. Cl.[4] .............................................. B08B 3/04
[52] U.S. Cl. .................................... 134/10; 134/25.1; 134/26; 210/908; 210/909; 585/861; 208/262.5; 208/262.1
[58] Field of Search ................... 134/10, 25.1, 26; 210/909, 908; 585/861; 208/262

[56] References Cited

U.S. PATENT DOCUMENTS

| | | | |
|---|---|---|---|
| 4,405,448 | 9/1983 | Googin et al. | 208/262 |
| 4,424,081 | 1/1984 | Giguere | 134/10 |
| 4,507,155 | 3/1985 | Cheek | 134/6 |
| 4,574,013 | 3/1987 | Peterson | 134/2 |
| 4,662,948 | 5/1987 | Weitzman | 134/25.1 |
| 4,698,148 | 10/1987 | Keane | 208/390 |
| 4,699,667 | 10/1987 | Walsh | 134/12 |
| 4,726,905 | 2/1988 | Friedman et al. | 134/7 |
| 4,783,263 | 11/1988 | Trost | 210/638 |
| 4,841,998 | 6/1989 | Bruya | 134/10 |

FOREIGN PATENT DOCUMENTS

| | | |
|---|---|---|
| 59020 | 9/1982 | European Pat. Off. |
| 161698 | 11/1985 | European Pat. Off. |
| 178009 | 4/1986 | European Pat. Off. |

*Primary Examiner*—Asok Pal

[57] ABSTRACT

A method of decontaminating solid material consisting of removing organic hazardous waste from contaminated solid material with an aqueous ammonia solution. The resulting aqueous ammonia solution containing organic hazardous waste is further processed to isolate the organic hazardous waste in a small volume for disposal. Solid material such as soil so treated can be returned to the excavation site without further processing.

30 Claims, 3 Drawing Sheets

SOLIDS DECONTAMINATION METHOD WITH AMMONIA

CROSS-REFERENCE TO RELATED APPLICATION

This application is a continuation-in-part application of application Ser. No. 113,628, now U.S. Pat. No. 4,841,998 filed Oct. 26, 1987.

BACKGROUND OF THE INVENTION

1. Field of the Invention

The present invention broadly pertains to a method of decontaminating solid material such as soil by contacting the solid material with a liquid treating agent. More particularly, this invention consists of a method of decontaminating solid material such as soil which has been contaminated with an organic hazardous waste, comprising contacting the material with an aqueous ammonia solution to extract the organic hazardous waste from the material.

2. Description of the Prior Art

Various methods have been employed to remove contaminants from contaminated solids such as soil. Wagner et al (U.S. Pat. No. 4,392,892) discloses a method whereby soil, sand or residues that contain oil or petroleum hydrocarbons are impregnated with an aqueous solution containing microbially-produced glycolipids. The resulting oil phase or emulsion leaves the capillaries of the oil-containing material, rises out of the aqueous phase, and is thereafter separated.

Giguere (U.S. Pat. No. 4,424,081) discloses a method for reconditioning soils contaminated with heavy crude, refined petroleum, and/or chemical products derived from similar sources. The method involves mixing the solid with water, sodium hydroxide and steam to provide a blended slurry. The blended slurry is further agitated and heated in a sparger kiln to approximately 210° F. (99° C.) at the kiln outlet to provide a fine particle slurry. A caustic liquid is also injected at the kiln inlet to facilitate extraction of the contaminants from the slurry. Separation of oil particles from the fine particle slurry is accomplished by first washing the slurry in a clarifier, followed by a second washing in flotation cell units, and finally subjecting the slurry to an aeration clarifier. A fatty acid or alcohol reagent is added at the aeration stage which produces a foam to which the oil particles adhere.

Peterson (U.S. Pat. No. 4,574,013) discloses a method for decontaminating soil containing halogenated contaminants by reaction schemes that are carried out in a slurry of soil and a nonaqueous reagent mixture. Peterson's nonaqueous reagent mixture contains an alkaline component and a sulfoxide catalyst. There are four possibilities suggested for the alkaline component: an alkali metal hydroxide, an alkali metal hydroxide/alcohol mixture, an alkali metal hydroxide/glycol mixture, or an alkoxide. The Peterson process employs a nonaqueous reagent mixture, and therefore when wet soil is to be decontaminated, a vacuum is first applied to remove any water prior to contacting the soil with the nonaqueous reagent mixture.

Weitzman (U.S. Pat. No. 4,662,948) discloses a method for removing polychlorinated biphenyls (PCB) and chlorinated dioxins from solids (particularly soil). In the Weitzman method, the contaminants are removed by contacting the solids with a nonaqueous liquid containing a halogenated hydrocarbon. Preferably, a smaller amount of polar organic solvent (normally methanol) is also used. The polar organic solvent apparently improves the wettability of the contaminated solids thus allowing the halogenated hydrocarbon to more easily extract PCB and dioxins.

In a study published by the U. S. Department of Commerce (National Technical Information Service #PB84-123637), funded by the United States Environmental Protection Agency and conducted by Rexnord, Inc., the requirements necessary for mobile systems for extracting spilled hazardous materials from excavated soils were analyzed. One result of the study was a listing of the characteristics necessary for an effective extraction fluid. Chief among these characteristics was a solvent possessing low volatility under ambient conditions.

Aqueous ammonia, a volatile solvent under ambient conditions, would not be considered a suitable extraction fluid according to the above study and therefore, has not been used to decontaminate soil. Aqueous ammonia has been used as a solvent for cleaning mechanical devices. For example, Cheek (U.S. Pat. No. 4,507,155) discloses a cleaning composition that includes a chlorinated hydrocarbon liquid, a petroleum distillate, an aliphatic alcohol, and aqueous ammonia. The composition consists of two phases, which must be shaken before application. The ammonia concentration of the composition is kept low (20-33% maximum) to prevent burns to the handler. The composition is disclosed as being suited for removing dried printing ink from printing equipment such as printing rollers. The composition also is reportedly useful as a spot remover for removing various stains from textile articles.

A need exists for relatively inexpensive methods for decontaminating large volumes of contaminated solid material such as soil, found, for example, around hazardous waste dump sites, that would remove virtually all types of hazardous wastes, both organic and inorganic. Furthermore, as the volume of these hazardous wastes at dump sites accumulates, and as our understanding of the long-term health effects of these wastes increases, the need for such methods will undoubtedly increase.

Unfortunately, there are very few methods currently available that are suitable to decontaminate large quantities of contaminated solid material. The few methods that are available are quite costly and are applicable to only a narrow spectrum of contaminants. Further, these methods either leave as their end-product small amounts of contaminants dissolved in large volumes of extracting solution or leave transformed chemicals in the soil which can continue to threaten our environment, even though not currently recognized. These methods provide little help in dealing with the disposal of the large amounts of wastes found at hazardous waste dump sites.

The present invention provides an easy-to-use method for decontaminating large volumes of soil containing hazardous organic waste utilizing readily available equipment, and widely available and inexpensive materials. It is applicable to a broad spectrum of contaminants and, unlike prior art methods, leaves a relatively small volume of waste residue.

SUMMARY OF THE INVENTION

A method is thus provided for decontaminating solid material such as soil comprising separating an aqueous ammonia solution containing an organic hazardous waste from the solid material after contacting the material contaminated with the organic hazardous waste with an aqueous ammonia solution. The method for decontaminating the solid material consists of forming an aqueous ammonia solution effective for removing organic hazardous waste from contaminated material, contacting the material contaminated with organic hazardous waste with an aqueous ammonia solution thereby transferring the organic hazardous waste from the material to the aqueous ammonia solution and thereafter separating the aqueous ammonia solution containing the organic hazardous waste from the material.

Essentially all types of organic hazardous waste may be extracted from the solid material by the method of this invention. However, the method is best employed in removing nonpolar organic hazardous wastes from solid material. These include polynuclear aromatic hydrocarbons, phthalate esters, mononuclear aryl, dinuclear aryl, substituted mononuclear aryl, polychlorinated biphenyls, chlorinated benzenes, chlorinated napthalenes, chlorinated phenols, halogenated phenyl esters, alkyl chlorinated hydrocarbons, and petroleum products. In this method, the aqueous ammonia solution ranges from about 0.1 to about 10% ammonia by weight. The aqueous ammonia solution preferably contains an organic promoter of effective concentration to enhance removal of the organic hazardous waste from the solid material. The organic promoter is selected from the group consisting of saturated hydrocarbons, unsaturated hydrocarbons and chlorinated hydrocarbons. Exemplary organic promoters include but are not limited to pentane, hexane, heptane, octane, mineral oil, fuel oil, toluene, Freon 113, 1,1,1-trichloroethane, and mixtures thereof, while the most preferred organic promoter is hexane.

The contacting step of the present invention in a preferred embodiment consists of forming a slurry of the contaminated soil and the aqueous ammonia solution, wherein the soil, prior to mixing, has a particle size of less than about 3 inches (7.5 cm) in diameter. The contacting step consists of intimately contacting the slurry of soil and the aqueous ammonia solution for from about 1 to about 10 minutes. During this time the slurry is agitated thereby more thoroughly transferring organic hazardous waste from the soil to the aqueous ammonia solution.

The separating step consists of separating the soil from the solution by permitting the soil to settle from the aqueous ammonia solution and thereafter removing the aqueous ammonia solution. Optionally, fine soil particles are removed from the aqueous ammonia solution by centrifugation.

After separating the soil from the aqueous ammonia solution, the organic hazardous waste is isolated from the aqueous ammonia solution. The isolating step consists of contacting the aqueous ammonia solution containing the organic hazardous waste with an organic extracting solvent under extraction conditions, thereby transferring organic hazardous waste from the aqueous ammonia solution to the organic extracting solvent. The organic extracting solvent, containing organic hazardous waste, is then distilled, thereby separating the organic extracting solvent from the organic hazardous waste. The distilled organic extracting solvent is collected and reused in subsequent extracting steps.

Exemplary organic extracting solvents include but are not limited to pentane, hexane, heptane, octane, toluene, Freon 113, 1,1,1-trichloroethane, and mixtures thereof, with the preferred organic extracting solvent being hexane.

The aqueous ammonia solution after having organic hazardous waste separated therefrom can be collected and reused in decontamination of additional solid material. In one embodiment of the present invention, the isolating step consists of volatilizing the ammonia from the aqueous ammonia solution thereby forming an organic phase consisting essentially of organic hazardous waste and an aqueous phase, and thereafter removing the organic phase. The volatilizing step consists of heating the aqueous ammonia solution to an effective temperature for an effective duration sufficient to remove essentially all of the ammonia in the aqueous ammonia solution. Optionally, the volatilized ammonia is collected (e.g., by condensation or bubbling into water) and remixed with feed water thereby forming an aqueous ammonia solution suitable for reuse in treating contaminated solid material.

In an alternative embodiment, the isolating step consists of volatilizing ammonia from the aqueous ammonia solution thereby forming an organic phase and an aqueous phase. Both the organic phase and the aqueous phase are thereafter contacted with an organic extracting solvent. The organic extracting solvent containing organic hazardous waste can be discarded without further processing or can be distilled thereby separating the organic hazardous waste from the organic extracting solvent. The organic hazardous waste is thereafter disposed of. When the organic extracting solvent is to be disposed of it desirably consists of diesel oil, petroleum ether, gasoline, mineral oil, fuel oil and mixtures thereof.

The method of this invention may include a plurality of contacting and separating steps in sequential order.

DETAILED DESCRIPTION OF THE INVENTION

This invention is a method for decontaminating contaminated solid material. The method is useful, for example, in decontaminating soil of virtually any type, but is particularly useful for decontaminating soil found in and around toxic waste dumps, or sites of large-scale soil contamination.

This method is also suitable for the decontamination of semi-porous material such as concrete. However, materials of this type must be ground before processing.

While this method is applicable to decontamination of any of the standard soil types, clay has proven somewhat troublesome in clogging the process equipment involved.

Wood and like organic materials, while treatable, tend to float on the aqueous ammonia solution. Such materials are thus desirably retained beneath the surface of the solution by any suitable means such as by mesh screening placed on top of the material. Alternatively, such material may be placed within porous baskets or containers which are submerged within the solution.

Additional solid materials which frequently become contaminated with organic hazardous waste materials include but are not limited to iron and steel products, aluminum materials, asphalt, textile materials, andfloor materials such as linoleum.

In its simplest form, this invention is a method for decontaminating solid material which consists of contacting solid material, which has been contaminated with an organic hazardous waste, with an aqueous ammonia solution, and thereafter separating the aqueous ammonia solution containing the organic hazardous waste from the solid material. When the decontaminated solid material consists of soil the soil can usually be returned to the excavation site without further treatment since residual ammonia will behave as a fertilizer. In some cases, residual ammonia may have to be partially removed. This can be easily achieved by washing the soil with fresh water or by volatilizingtthe residual ammonia by application of heat.

The method of decontaminating solid material is suitable for use with all types of organic hazardous wastes. The method is particularly well suited for removing those nonpolar organic hazardous wastes found around hazardous waste disposal sites. Desirably, such wastes are also substantially non-volatile by nature. By nonpolar, as used herein, is meant those compounds, which in aqueous solution exhibit a polarity less than water, and which are not charged at neutral pH. Organic hazardous wastes include but are not limited to those organic compounds which are defined as hazardous wastes under 40 CFR Part 261, Subpart D, herein incorporated by reference.

Examples of organic hazardous wastes suitable for use in accordance with the present invention include, but are not limited to, polynuclear aromatic hydrocarbons (PNA), for example benzo[a]anthracene, benzo[a]pyrene, benzo[b]fluoranthene, benzo[k]fluoranthene, chrysene, acenaphthylene, anthracene, benzo[ghi]perylene, fluorene, phenanthrene, dibenzo[a,h]anthracene, indeno[1,2,3-cd]pyrene, and pyrene; phthalate esters, for example bis(2-ethylhexy)phthalate, butyl benzyl phthalate, di-n-butyl phthalate, di-n-octyl phthalate, diethyl phthalate, and dimethyl phthalate; mononuclear aryls, for example, benzene; substituted mononuclear aryls, for example, n-pentyl benzene, and 2,6-dinitrotoluene; dinuclear aryls, for example, naphthalene; polychlorinated biphenyls, for example PCB-1242, PCB-1254, PCB-1221, PCB-1232, PCB-1248, PCB-1260, and PCB-1016; chlorinated benzenes, for example, chlorobenzene, 1,2,4-trichlorobenzene, and hexachlorobenzene; chlorinated naphthalenes, for example, 2-chloronaphthalene; chlorinated phenols, for example, 2,4,6-trichlorophenol, para-chlorometa-cresol, 2-chlorophenol, pentachlorophenol, and 2,4-dichlorophenol; halogenated phenyl ethers, for example, 4-chlorophenol phenyl ether, and 4-bromophenyl phenyl ether; alkyl and alkyl substituted chlorinated hydrocarbons, for example, aldrin, dieldrin, chlordane, DDT, 4,4'-DDT, 4,4'-DDE, 4,4'-DDD, alpha-endosulfan, beta-endosulfan, endosulfan sulfate, endrin, endrin aldehyde, heptachlor, heptachlor epoxide, hexachloroethane, bis(chloromethyl)ether, bis(2-chloroethyl)ether, 2-chloroethyl vinyl ether, 2,3,7,8-tetrachlorodibenzo-p-dioxin, 3,3-dichlorobenzidine, and toxaphene; and petroleum products, for example, oil, grease, gasoline, turbine fuel, hydraulic fluid, and fuel oils. Preferred organic wastes for treatment by the present invention are listed in Appendix VIII of 40 CFR Part 261, herein incorporated by reference.

Figure 1:
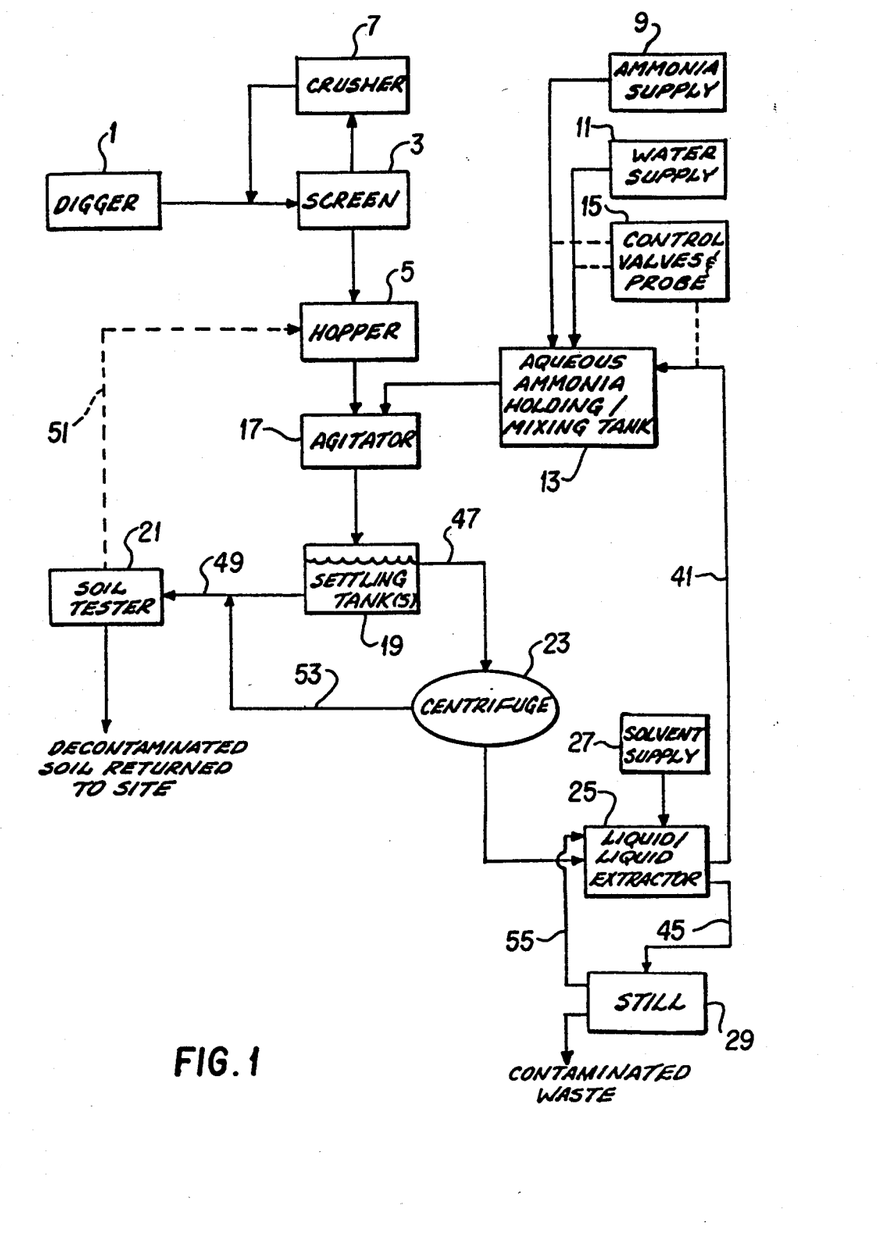
FIG. 1 is a block diagram representing the decontamination method in the treatment of soil employing a liquid/liquid extractor and still.

The method of this invention is best understood by referring to FIG. 1, which depicts a soil decontamination embodiment of the present invention. The method consists of digging up contaminated soil by any conventional digger means 1. A preferred way of digging up the soil is with the use of equipment such as a backhoe or front-end loader. Equipment of this type is preferred because it is readily available and inexpensive. It is preferable to locate the process equipment near the contaminated soil in order to prevent spreading of the organic hazardous waste. Transporting the contaminated material any appreciable distance increases the possibility of spillage, and further uncontrolled release of the hazardous material.

After the soil has been removed from the contaminated site and transported to the location of the decontaminating process equipment, the contaminated soil is screened with a screening device 3. The screening device is designed to allow soil particles of about 3 inches (7.5 cm) in diameter or less to pass into a soil-holding device such as a hopper 5. Those soil particles greater than 3 inches (7.5 cm) in diameter are treated separately, or are sent to a crusher 7, where they are ground and rescreened.

Next, an aqueous ammonia solution is formed. This may be accomplished by mixing liquid ammonia 9 with water 11. The preferred concentration of the aqueous ammonia solution is from about 0.1% to about 10% ammonia by weight. A steady source of aqueous ammonia solution is best accomplished through the use of an aqueous ammonia holding tank 13. The tank may also contain mixing apparatus in order to maintain a constant concentration throughout the tank. Additionally, control valves 15 on the ammonia and water supply, as well as use of an ammonia probe monitor, can be used to maintain a constant concentration of aqueous ammonia in the tank 13.

In an alternative embodiment, the aqueous ammonia solution may be formed in the presence of the soil. This is accomplished by simply mixing liquid ammonia, water, and soil in any order, with the proviso that the final concentration of ammonia in aqueous solution be within the preferred concentration limits.

A preferred embodiment of this invention includes the addition of an organic promoter to the aqueous ammonia solution. By organic promoter is meant an organic solvent that helps promote the transfer of the organic hazardous waste from the soil to the aqueous ammonia solution. It is believed the organic promoter facilitates extraction of organic hazardous waste from soil by promoting the formation of micelles. Hexane and toluene are the most preferred organic promoters. Exemplary promoters include pentane, hexane, heptane, octane, toluene, mineral oil, fuel oil and combinations thereof. However, any hydrocarbon or chlorinated hydrocarbon is suitable for use as a promoter. Usually, trace amounts of the promoter are sufficient to promote removal of the toxic waste from the soil. The exact promoter used and its concentration depend on both the operating temperature and configuration of the decontaminating apparatus, as well as the organic extracting solvent used. The exact promoter, and its proper concentration will be known to those skilled in the art.

Continuing to refer to FIG. 1, the contaminated soil housed within the hopper is transferred, preferably with an auger or similar transport device, to an agitator 17 where it is mixed with the aqueous ammonia solution to form a slurry. Through mixing in the agitator, the contaminated soil and aqueous ammonia solution are well contacted. The preferred time of contact in the agitator is from about 1 to about 10 minutes. Such contacting may also occur under varied conditions of temperature and pressure including temperatures in the range of from about −5° C. to +60° C. and either negative, ambient or elevated pressures. Desirably, the contacting conditions which are employed will not result in a significant decrease in the concentration of the ammonia in the aqueous solution during the initial stage of the contacting step.

The resulting slurry is transferred to a settling tank 19, or series of settling tanks, to separate the aqueous ammonia solution containing organic hazardous waste from the soil. Here, most of the soil particles will settle to the bottom of the tank. The aqueous ammonia solution, which now contains the organic hazardous waste that was present in the soil, will remain in the upper portion of the tank above the settled soil. This solution 47 can be easily removed by, for example, simple decantation and further processed.

For smaller decontaminating setups, the agitator and settling tank(s) can be replaced with a modified cement mixer or the equivalent. This modified mixer can provide the necessary agitation required for the desired period of contact, after which the aqueous ammonia solution containing the organic hazardous waste is removed.

The soil 49 removed from the settling tank(s) is then tested in soil tester 21 by any of the accepted testing procedures known to those skilled in the art. Soil which has been sufficiently decontaminated according to the soil test is then returned to the site. Soil 51, incompletely decontaminated, is recycled to the hopper or agitator, further subjecting the soil to one or more contacting and separating steps. These recycling steps can be repeated until the desired level of decontamination has been accomplished.

In a preferred embodiment of the invention, the aqueous ammonia solution 47 containing the organic hazardous waste which is removed from the settling tank(s) is sent to a centrifuge 23. Centrifuging removes any suspended or fine soil particles 53 that may not have been separated from the aqueous ammonia solution in the settling tank(s).

Chemically, the method of this invention is best viewed as two independent extraction steps. The first is removing the organic hazardous waste from the contaminated soil, employing an aqueous ammonia solution, as described above. The second consists of isolating the organic hazardous waste from the aqueous ammonia solution. The second step is important, and is a preferred embodiment of the present invention, since the organic hazardous waste is best isolated and reduced to a small volume prior to disposal. Isolation is usually necessary because a small amount of hazardous material contained within a large volume of liquid usually cannot be disposed of economically. However, if an incinerator is located at the soil decontamination site, the second step may not be necessary.

In isolating the organic hazardous waste from the aqueous ammonia solution, it is preferred that alternative process steps and equipment be employed dependent on the concentration of ammonia in the aqueous ammonia solution. High concentrations of ammonia (e.g., more than 5%) increase the efficiency of removal of organic hazardous waste from the soil, and conversely, low concentrations of ammonia (e.g., below 5%) decrease the efficiency of removal of organic hazardous waste from soil. However, isolation of organic hazardous waste from the aqueous ammonia solution is more easily achieved with low ammonia concentrations than with high concentrations of ammonia.

As previously described, ammonia concentrations between 0.1% and 10% are preferred in most situations. However, higher or lower concentrations of ammonia may be employed depending on the nature of the material being processed.

At low concentrations of ammonia, the isolation procedure shown in FIG. 1 is used. The aqueous ammonia solution containing the organic hazardous waste leaves the settling tank(s), and thereafter is transported to a liquid-liquid extractor 25. If, as previously described, the aqueous ammonia solution contains substantial quantities of fine suspended soil, the solution is optionally centrifuged prior to being transported to the liquid-liquid extractor. The aqueous ammonia solution containing the organic hazardous waste is introduced into a bed of organic extracting solvent. The organic hazardous waste partitions itself between the two solutions, but predominantly in the organic extracting solvent. The substantially purified aqueous ammonia solution then separates due to density differences between the liquids. It will be obvious to those skilled in the art that a more complete partition of the organic hazardous waste can be achieved by increasing the surface area, or contact time, of the aqueous ammonia solution containing organic hazardous waste with the organic extracting solvent. This can be achieved, for example, by mixing or agitating the aqueous ammonia solution with the organic extracting solvent in the liquid-liquid extractor 25.

The organic extracting solvent 45 which now contains the organic hazardous waste is removed and, in a preferred embodiment, is transported to a distillation apparatus 29. The organic extracting solvent containing organic hazardous waste is then distilled and the organic hazardous waste is isolated and disposed of. In another preferred embodiment, the organic extracting solvent 55 is collected and recycled for use in the liquid-liquid extractor. Optionally, the aqueous ammonia solution 41 is removed and recycled to the aqueous ammonia solution holding tank 13. In most applications, this recycled aqueous ammonia solution is substantially void of organic hazardous waste. However, when there has been incomplete partitioning of organic hazardous waste between the organic extracting solution and the aqueous ammonia solution, the aqueous ammonia solution can be subjected to a plurality of extractions with the organic extracting solvent.

Preferred organic extracting solvents in this isolation method are moderate range boiling hydrocarbon and halogenated hydrocarbon solvents such as the various isomers of pentane, hexane, heptane, octane, toluene, Freon 113, 1,1,1-trichloroethane, and mixtures thereof.

For high concentrations of ammonia, i.e., greater than 5%, it is preferred that the ammonia is first removed from the aqueous ammonia solution containing the organic hazardous waste. The removal of ammonia is accomplished by volatilizing ammonia from the aqueous ammonia solution. The volatilizing step may consist, for example, of heating the aqueous ammonia solution to an effective temperature, and for an effective duration, sufficient to remove the ammonia from the aqueous ammonia solution containing the organic hazardous waste. One of ordinary skill will be able to determine the exact conditions necessary to effect volatilization. Volatilization of the ammonia by exposing the aqueous ammonia solution to a vacuum is an equivalent way to remove ammonia. In one embodiment of the invention, the volatilized ammonia 57 is collected in condenser 33 and recycled as a liquid stream 59 to the aqueous ammonia holding tank 13. In this embodiment, smaller amounts of ammonia feedstock are required since a substantial quantity of the ammonia can be recovered and reused. Collecting, and reusing the ammonia may also be necessary to meet local air-quality standards governing the emission of ammonia gas.

The exit stream from the volatilizer 31 then contains an organic phase consisting essentially of organic hazardous waste, an aqueous phase consisting primarily of water which may contain small amounts of organic hazardous waste, and trace amounts of promoter.

Figure 2:
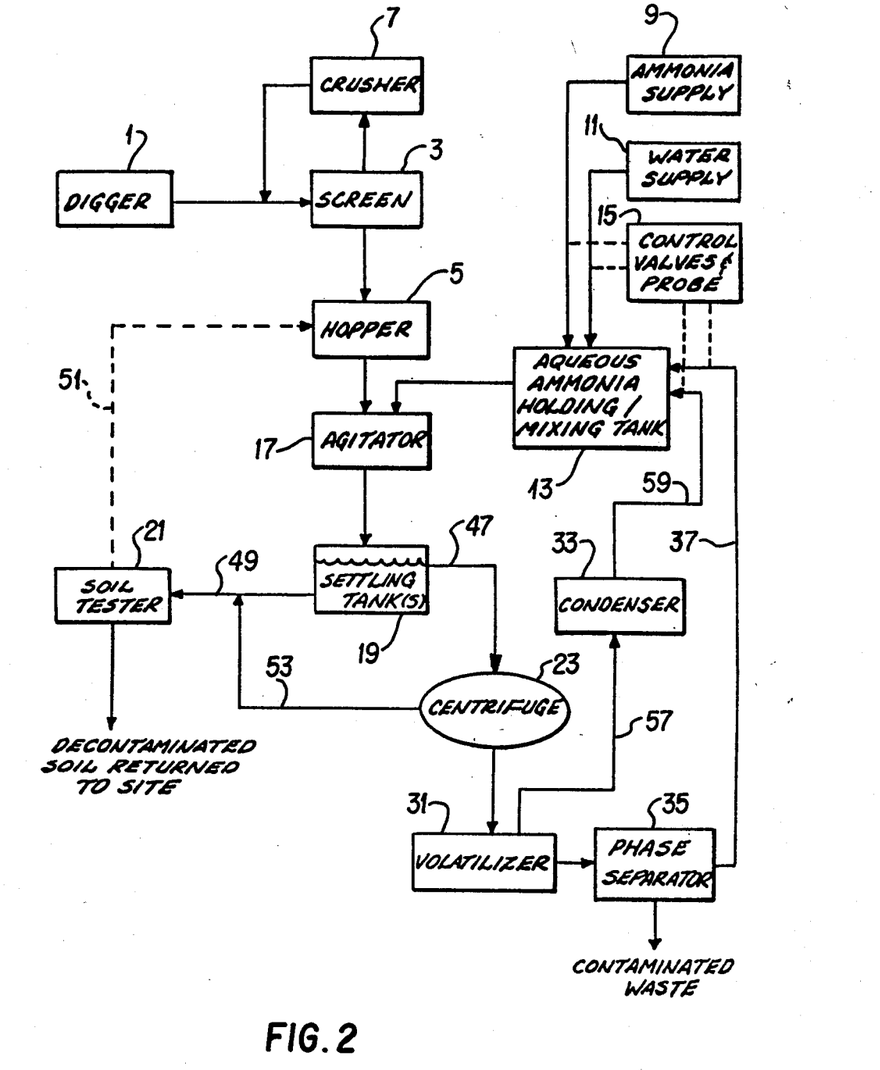
FIG. 2 is a block diagram representing the decontamination method in the treatment of soil employing a volatilizer, condenser, and phase separator.

The present invention offers two alternative methods of isolating the organic hazardous waste after the volatilizing step. In one alternative embodiment, a more economical but somewhat less effective isolation method consists of sending the aqueous phase and the organic phase to a phase separator 35. In this embodiment, the organic hazardous waste is isolated by simply removing the organic phase and recycling the aqueous phase 37. This isolation method is demonstrated by reference to FIG. 2.

Figure 3:
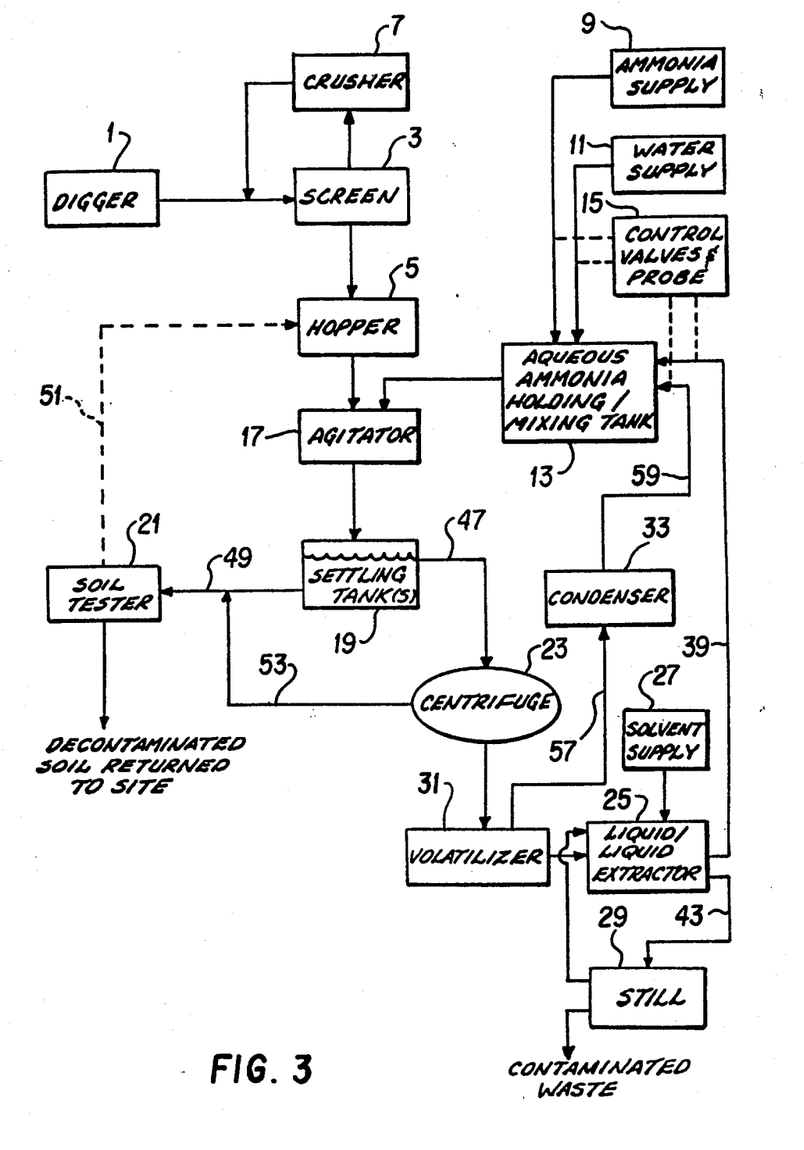
FIG. 3 is a block diagram representing the decontamination method in the treatment of soil employing a liquid/liquid extractor, still, volatilizer, condenser, and phase separator.

The second alternative embodiment of the present invention for isolating the organic hazardous waste after the volatilizing step is represented in FIG. 3. It consists of contacting the organic phase and the aqueous phase with an organic extracting solvent in a liquid-liquid extractor 25, preferably under agitation such as results from tumbling, sonication, etc. In the liquid-liquid extractor, the stream leaving the volatilizer 31 is dispersed in a bed of organic extracting solvent. As a result, the organic hazardous waste is partitioned primarily in the organic extraction solvent. The organic phase 43 can be removed and sent to a distillation apparatus 29 or disposed of in an incinerator (not shown). If incineration is the method chosen for disposal of the organic hazardous waste, then the preferred organic extraction solvents include diesel fuel, petroleum ether, gasoline, mineral oil, fuel oil or mixtures thereof. It is preferred that in this case the organic extracting solvent be the cheapest fuel available. If on the other hand a distillation apparatus 29 is employed, the organic hazardous waste is isolated by simple distillation of the organic extracting solvent and thereafter properly disposed of.

In a preferred embodiment, the organic extracting solvent 43 used in the extraction, together with trace amounts of promoter, is recycled for reuse in the extractor 25. Advantageously, the promoter and the organic extraction solvent used in the liquid-liquid extractor may be the same substance. The aqueous phase 39 which is substantially free of organic hazardous waste can, in one embodiment of the invention, be removed and recycled to the aqueous ammonia solution holding tank 13, where it can be reused to form an aqueous ammonia solution.

The amounts of aqueous ammonia solution, promoter, organic extracting solvent, and the types of machinery and processing equipment have not been specified. This is because one of ordinary skill, upon reading this disclosure, will be capable of selecting the proper amounts of solutions and processing equipment to effect removal of toxic waste from soil to any desired level, depending on soil characteristics at the site of contamination.

The following examples are included to assist one of ordinary skill in making and using the invention. They are intended as representative examples of the present invention and are not intended in any way to limit the scope of this disclosure or the scope of protection granted by Letters Patent hereon.

EXAMPLE 1

Five grams of a soil sample (sandy with a high organic content) contaminated with mixed PCB's were placed in an 8 fluid dram glass vial of a size approximately 4 inches (10 cm) tall and 0.75 inches (2 cm) wide. Ten milliliters of a 3.7% aqueous ammonia solution was added and then overlaid with 5 milliliters of hexane. The vial was capped and rolled on its side for about 5 minutes to admix the contents. An aliquot of the hexane was then removed. More hexane was added and the process was repeated. Analysis of the hexane extracts by gas chromatography with an electron capture detector showed a decreasing PCB content as the number of extractions continued. Final analysis of the soil showed a decreased PCB concentration. Three extractions were required to lower the PCB concentration from an initial level of approximately 1,000 ppm to a final concentration of less than 50 ppm by weight, with such test occurring at room temperature and ambient pressure.

The following organic hazardous wastes can be analogously removed from soil by treatment with 3.7% aqueous ammonia solution:

| | |
|---|---|
| PCB-1242 | chlorobenzene |
| PCB-1254 | 1,2,4-trichlorobenzene |
| PCB-1221 | hexachlorobenzene |
| PCB-1232 | 1,2-dichlorobenzene |
| PCB-1248 | 1,3-dichlorobenzene |
| PCB-1260 | 1,4-dichlorobenzene |
| PCB-1016 | 2-chloronaphthalene |

EXAMPLE 2

Five grams of a soil sample (sandy with a high organic content) contaminated with mixed PCB's were placed in a glass vial in the same manner as Example 1. Ten milliliters of a 0.1% aqueous ammonia solution was added and then overlaid with 5 milliliters of hexane. The mixture was briefly stirred in the same manner as Example 1 and the hexane was removed. More hexane was added and the process was repeated. Analysis of the hexane extracts also in the same manner as Example 1 showed a decreasing PCB content as the number of extractions continued. Final analysis of the soil showed a decreased PCB concentration. Multiple extractions were required to lower the PCB concentration from an initial level of approximately 1,000 ppm to a final concentration of less than 50 ppm by weight.

The following organic hazardous wastes can be analogously removed from soil by treatment with 0.1% aqueous ammonia solution:

| | |
|---|---|
| benzene | ethyl benzene |
| naphthalene | fluoranthene |
| toluene | isophorone |
| 2,6-dinitrotoluene | benzo[a]pyrene |

-continued phenathrene

EXAMPLE 3

Five grams of a soil sample (sandy with a high organic content) contaminated with diesel fuel was placed in a glass vial, and ten milliliters of a 10% aqueous ammonia solution was added in the same manner as Example 1. The mixture was briefly stirred in the same manner as Example 1. The aqueous ammonia solution was thereafter separated from the soil by pipette and the ammonia permitted to volatilize by exposure to ambient room air for several days. The remaining liquids were then contacted with hexane. Analysis of the hexane solution by gas chromatography with a flame ionization detector showed the diesel fuel was extracted by this process.

The following organic hazardous wastes can be analogously removed from soil by treatment with 10% aqueous ammonia solution:
aldrin
dieldrin
chlordane
DDT and metabolites
4,4'-DDT
4,4'-DDE
4,4'-DDD
endosulfans
alpha-endosulfan
beta-endosulfan
endosulfan sulfate
endrin
endrin aldehyde
heptachlor
heptachlor epoxide
hexachloroethane
bis(chloromethyl)ether
bis(2-chloroethyl)ether
2-chloroethyl vinyl ether
2,3,7,8-tetrachlorodibenzo-p-dioxin
3,3-dichlorobenzidine
toxaphene
benzo[a]anthracene
benzo[a]pyrene
benzo[b]fluoranthene
benzo[k]fluoranthene
chrysene
acenaphthylene
anthracene
benzo[ghi]perylene
fluorene
phenanthrene
dibenzo[a,h]anthracene
indeno[1,2,3-cd]pyrene
pyrene
bis(2-ethylhexyl)phthalate
butyl benzyl phthalate
di-n-butyl phthalate
di-n-octyl phthalate
diethyl phthalate
dimethyl phthalate

EXAMPLE 4

Concrete was contaminated with 100 ul of transformer oil containing 142 ppm PCB's (14.2 mg of PCB total). The concrete was contacted with 30 ml of a 3 percent ammonium hydroxide solution and sonicated for 15 minutes. The ammonia was driven off by mild heating. The oil and PCB floating on top of the solution was removed and the solution poured off. The concrete was then extracted with methanol/water/hexane to remove residual PCB's. The concrete was shown to contain less than 1 mg. PCB's.

The present invention has been described in relation to a preferred embodiment thereof and several alternatives thereto. One of ordinary skill, after reading the foregoing specification, will be able to effect various changes, substitutions of equivalents, and other alternations without departing from the broad concepts disclosed herein. It is therefore intended that the scope of Letters Patent granted hereon be limited only by the definition contained in the appended claims and equivalents thereof.

What is claimed is:

1. A method for decontaminating solid material contaminated with an organic hazardous waste comprising the steps of:
   (a) contacting said solid material contaminated with the organic hazardous waste with an aqueous ammonia solution for a period of time effective to transfer at least a portion of said organic hazardous waste from the solid material to the aqueous ammonia solution; and
   (b) separating the aqueous ammonia solution containing the organic hazardous waste from the solid material.

2. The method of claim 1, wherein the organic hazardous waste is nonpolar.

3. The method of claim 1, wherein the organic hazardous waste is selected from the group consisting of polynuclear aromatic hydrocarbons, phthalate esters, mononuclear aryls, dinuclear aryls, substituted mononuclear aryls, polychlorinated biphenyls, chlorinated benzenes, chlorinated naphthalenes, chlorinated phenols, halogenated phenyl ethers, alkyl chlorinated hydrocarbons, and petroleum products.

4. The method of claim 3, wherein the organic hazardous waste is selected from the group consisting of polynuclear aromatic hydrocarbons, phthalate esters, polychlorinated biphenyls, chlorinated benzenes, naphthalene, oil, grease, and diesel fuel.

5. The method of claim 1, wherein the aqueous ammonia solution comprises from about 0.1% to about 10% ammonia by weight.

6. The method of claim 1, wherein the aqueous ammonia solution further comprises an organic promoter to enhance removal of the organic hazardous waste from the solid material.

7. The method of claim 6, wherein the organic promoter is selected from the group consisting of an unsubstituted hydrocarbons and chlorinated hydrocarbons.

8. The method of claim 7, wherein the organic promoter is selected from the group consisting of pentane, hexane, heptane, octane, mineral oil, fuel oil, toluene, Freon 113, 1,1,1-trichloroethane, and mixtures thereof.

9. The method of claim 8, wherein the organic promoter is hexane.

10. The method of claim 1, wherein said contaminated material is in particulate form.

11. The method of claim 10, wherein the contacting step comprises forming a slurry of the solid material and the aqueous ammonia solution.

12. The method of claim 1, wherein said solid material has a particle size of less than about 7.5 cm in diameter.

13. The method of claim 11, wherein the slurry is agitated during said contacting step.

14. The method of claim 1, wherein said contacting occurs over a period of time ranging from about 1 to about 10 minutes.

15. The method of claim 1, wherein said separating step comprises permitting said solid material to settle from the aqueous ammonia solution containing said organic hazardous waste and recovering the aqueous ammonia solution.

16. The method of claim 10, wherein the separating step further comprises centrifuging said recovered aqueous ammonia solution to remove suspended solid material from the recovered aqueous ammonia solution.

17. The method of claim 16, wherein after the separating step, the organic hazardous waste is isolated from the aqueous ammonia solution.

18. The method of claim 17, wherein said isolating step comprises contacting the aqueous ammonia solution containing the organic hazardous waste with an organic extracting solvent, thereby extracting said organic hazardous waste from said aqueous ammonia solution, and recovering said organic extracting solvent containing said organic hazardous waste.

19. The method of claim 18, further comprising distilling said organic extracting solvent containing the organic hazardous waste, thereby removing the organic hazardous waste from the organic extracting solvent.

20. The method of claim 18, wherein the organic extracting solvent is selected from the group consisting of pentane, hexane, heptane, octane, toluene, Freon 113, 1,1,1-trichloroethane, and mixtures thereof.

21. The method of claim 20, wherein the organic extracting solvent is hexane.

22. The method of claim 17, wherein said isolating step comprises volatilizing ammonia from the aqueous ammonia solution, thereby forming an organic phase consisting essentially of organic hazardous waste and an aqueous phase, and separating said organic phase from said aqueous phase.

23. The method of claim 22, wherein said volatilizing step comprises heating the aqueous ammonia solution to a temperature, and for a period of time, effective to volatilize substantially all of the ammonia in the aqueous ammonia solution.

24. The method of claim 17, wherein said isolating step comprises volatilizing ammonia from the aqueous ammonia solution, thereby forming an organic phase consisting essentially of organic hazardous waste and an aqueous phase, and contacting the organic phase and the aqueous phase with an organic extracting solvent, thereby transferring the organic hazardous waste to the organic extracting solvent.

25. The method of claim 22, further comprising distilling the organic extracting solvent containing organic hazardous waste, thereby separating the organic hazardous waste from the organic extracting solvent.

26. The method of claim 24, wherein the organic extracting solvent is selected from the group consisting of diesel fuel, petroleum ether, gasoline, mineral oil, fuel oil, and mixtures thereof.

27. The method of claim 1, further comprising, in sequential order, a plurality of contacting and separating steps.

28. The method of claim 1 wherein said solid material is selected from the group consisting of concrete, wood, asphalt, iron, steel and aluminum.

29. The method of claim 1 wherein said solid material is concrete.

30. The method of claim 1 wherein said solid material is wood.

* * * * *